United States Patent [19]

Giugliano

[11] 3,939,870
[45] Feb. 24, 1976

[54] COMBINATION MANUAL AND PILOT OPERATED DIRECTIONAL CONTROL VALVE

[75] Inventor: Anthony V. Giugliano, Lisle, Ill.
[73] Assignee: Deltrol Corporation, Bellwood, Ill.
[22] Filed: Nov. 14, 1974
[21] Appl. No.: 523,912

[52] U.S. Cl. .... 137/624.27; 137/625.63; 137/625.6
[51] Int. Cl.² ........................................ F15B 13/01
[58] Field of Search..... 137/624.27, 625.69, 625.66, 137/625.63

[56] References Cited
UNITED STATES PATENTS

| | | | |
|---|---|---|---|
| 2,765,378 | 10/1956 | Perry | 137/625.69 X |
| 2,874,720 | 2/1959 | Vabs | 137/624.27 |
| 3,106,135 | 10/1963 | McAfee | 137/625.69 X |
| 3,736,958 | 6/1973 | Rostad | 137/625.66 X |

Primary Examiner—Alan Cohan
Attorney, Agent, or Firm—John L. Harris

[57] ABSTRACT

A regular manual lever operated directional control valve is converted to a remote pilot controlled valve without loss of the manual operation feature. A double acting cylinder is attached to the end of the valve housing remote from the manual lever and the piston rod in the cylinder is directly attached to the valve spool. Semi-automatic operation is provided by mounting a valve positioning unit to the end of the operating cylinder and attaching it to the other end of the piston rod. This unit includes pressure released detent mechanism. Pressure buildup in the valve ports is transmitted to a detent release piston by passages through the valve spool and piston rod.

2 Claims, 3 Drawing Figures

COMBINATION MANUAL AND PILOT OPERATED DIRECTIONAL CONTROL VALVE

BACKGROUND OF THE INVENTION

This invention relates in general to hydraulic controls and more particularly to directional control valves for controlling pressure fluid actuating a hydraulic cylinder.

Manually operated hydraulic directional control valves are well known for controlling power cylinders in a wide variety of applications. Manual operation is provided by a lever mounted at one end of the valve housing and connected by a linkage to the longitudinally movable valve spool. Semi-automatic operation is provided by a valve positioning unit mounted on the other end of the valve housing. Such units include a pair of biasing springs which bias the valve spool to its neutral or center position, and a detent mechanism for holding the valve spool in either power position until pressure buildup indicates the power stroke of the cylinder has been completed.

Pilot controlled directional control valves are also well known in the art. These valves have included two cylinders mounted at opposite ends of the valve spool, one cylinder pushing the spool in one direction and the other cylinder pushing the spool in the opposite direction. Manual operation of these valves is not possible.

Where both remote control and manual operation at the valves are desired, it has been customary to operate the valves from the remote point by push pull cables. The cables often present an an installation problem especially in mobile applications with tilt cab vehicles. In addition, after a period of time these cables become unreliable.

BRIEF SUMMARY OF THE INVENTION

The primary object of the invention is the provision of a directional control valve which can be pilot controlled from a remote point and also actuated manually.

This arrangement permits the valve to be operated from two or more locations without complicated heavy linkages. It also permits the manual feature to be used as one of the operating stations. It further provides an important safety feature as the manual operator is always available in case of failure of the remote control system.

In the case of mobile applications, the valve and manual operator can be located on the outside of the vehicle and the remote controls in the cab with only small flexible lines running between them. The valve can be operated directly by people outside the vehicle and also can be operated from inside the cab.

A further object of the invention is the provision of a pilot operated directional control valve with a manual overide, which can be used at any time to position the valve. This is achieved by a double acting cylinder having one end attached to one end of the valve body in combination with a valve positioning unit attached to the other end of the cylinder. In operation, fluid pressure is momentarily applied to one side of the piston, moving the valve to one power position where it is retained by the valve positioning unit. As the pilot controlled fluid pressure is only momentary the valve can be returned to the neutral position either automatically by release of the valve positioning unit or by the manual overide which overcomes the holding mechanism in the valve positioning unit.

Another object is the provision of a piston actuated directional control valve in which only momentary pressure on the piston is required to position the valve and hold it in place.

A further object of the invention is the provision of a single double acting cylinder for positioning a directional control valve, in which pressure areas on the piston are equal for both directions of spool travel.

Other objects will appear from the following detailed description and appended claims.

DETAILED DESCRIPTION OF THE INVENTION

Figure 1:
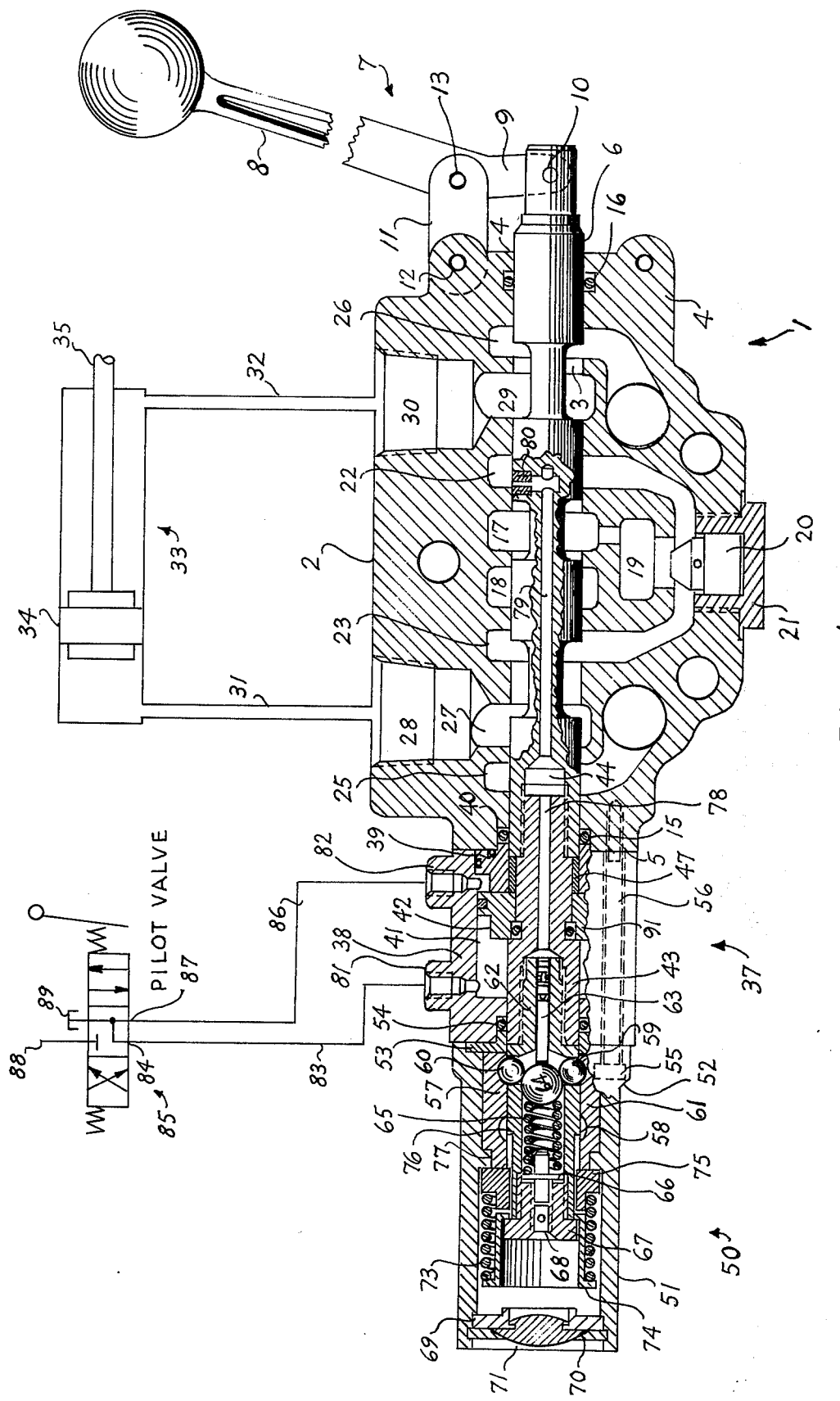
FIG. 1 is a cross section of a directional control valve assembly embodying the invention in combination with an automatic return to neutral type spool positioning mechanism and including a schematic representation of the pressure operated pilot control system.
Figure 2:
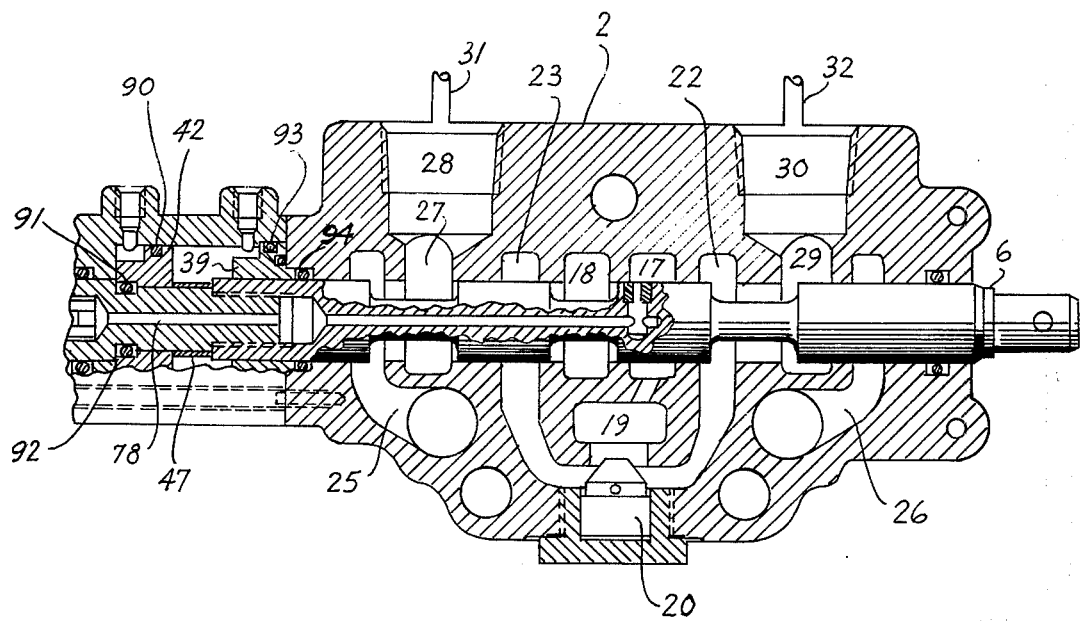
FIG. 2 is a partial sectional view of the mechanism shown in FIG. 1 but with the spool valve at the opposite end of its stroke.

Referring to FIGS. 1 and 2, reference character 1 indicates generally a conventional spool valve assembly including a valve body 2 having a spool valve bore 3 extending from the right end 4 of the body to the left end 5 of the body. The bore 3 receives a double ended spool valve member 6 which is axially movable in the bore 3. The right end of the spool 6 extends beyond the end of the valve body and is manually actuatable by a manual operating means generally indicated as 7. This manual operating means may be of usual construction including an operating handle 8 having a portion 9 extending into a slot formed in the end of the valve spool 6 and being attached thereto by a pin 10. The handle 8 is also supported by one or a pair of links 11, the left end being secured to the valve body by a pin 12 and the right end being attached to the lever 8 by a pin 13. With the parts in the positions shown the valve spool 6 is in its right hand position. It will be apparent that pulling the handle 8 to the right as seen in FIG. 1 will cause manual movement of the valve spool toward its left hand position. It will also be apparent that movement of the operating handle 8 to the left will cause right hand motion of the valve spool 6.

The valve spool 6 also extends beyond the left end 5 of the valve body 2 and is sealed by an O-ring 15. A similar O-ring 16 seals the right end of the valve spool. The valve body 2 is of conventional construction including a high pressure well 17 and a low pressure exhaust passage 18 which are enlargements of the spool valve bore 3 and located adjacent the center of the valve body. The high pressure well 17 communicates through a flow passage with a load check valve chamber 19 receiving a load check valve member 20 carried in a plug 21 screwed into the valve body. This load check valve member 20 is biased upwardly by an internal spring (not shown) toward its valve seat formed at the bottom of passage 19. A bifurcated passageway is located beneath the valve seat, this passageway including one leg leading to the right and upwardly to a high pressure well 22 located to the right of the high pressure well 17. The other leg of this bifurcated passageway leads to the left and upwardly to a high pressure well 23 located to the left of the exhaust passage 18. The valve body 2 is also formed with a left exhaust passage 25 near the left end of the valve body and with a right exhaust passage 26 near the right end of the valve body. A pressure well 27 is located between the exhaust passage 25 and the high pressure well 23, this well communicating with a pressure port 28. A similar pressure well 29 is located between the high pressure well 22 and the low pressure passage 26, this pressure well communicating with a pressure port 30 leading to the outside of the valve body.

Ports 28 and 30 are for attachment to lines 31 and 32 leading to opposite ends of a power cylinder 33 (shown schematically) this power cylinder including a piston 34 and a piston rod 35. It will be understood that the high pressure port 17 is connected by a means not shown but well known in the art to the high pressure side of a hydraulic pump, and that the exhaust ports 18, 25 and 26 are connected to the usual hydraulic fluid reservoir leading to the inlet side of the pump. The spool valve member 6 controls the hydraulic fluid in and out of the cylinder 33 to cause movement of the piston 34 between its two end positions.

In accordance with the invention, the valve spool 6 is also actuated in both directions by a pilot controlled actuator generally indicated as 37. This actuator includes a cylinder 38 attached to the left end 5 of the valve body 3. This cylinder is positioned accurately relative to the spool valve bore by an adaptor 39 having a reduced portion extending into the recess 40 which is located adjacent the end of the spool valve bore and receives the O-ring 15. The cylinder 38 includes an interior cylinder wall 41 receiving a piston 42 which is carried by a piston rod 43 attached to the end of the spool valve member 6. Preferably the piston rod 43 is formed with a small diameter at its right hand end, a large diameter at its left hand end and an intermediate diameter which receives the piston 42. The small diameter portion extends into a bore 44 formed in the left hand end of the spool valve member. The shoulder between the small diameter and the intermediate diameter abuts the end of the spool valve member and the piston 42 is held against the shoulder between the intermediate and large diameters of the piston rod by a spacer 47.

As shown, the cylinder 38 is formed with a bore defined by the cylinder wall 41 for the piston 42. It is also formed with an enlarged bore at its right hand end which receives the adaptor 39, the shoulder between the two bores serving to hold the adaptor 39 in position. The arrangement shown serves to locate the cylinder bore defined by wall 41 in accurate alignment with the spool valve bore in the valve body. The reduced portion of the adaptor 39 extending into the bore 40 in the valve member accurately locates the adaptor 39 relative to the spool valve bore and the adaptor in turn accurately locates the cylinder bore relative to the spool valve bore.

Located to the left of the pilot controlled operator 37 is a detent type valve positioning unit 50. This valve positioning unit is of conventional construction and includes a cylindrical cap 51 which may have the usual rectangular base portion 52 which is recessed to receive a spacer 52 which extends into a recess in the end wall of cylinder 38 and retains an O-ring 54. The cap 51 and cylinder 38 are preferably fastened to the valve body 2 by means of four equally spaced screws, one of which is shown at 55. These screws extend through the rectangular base portion 52 of cap 51 and through suitable bores 56 into threaded holes in the valve body.

Inside the cap 51 is a detent groove sleeve 57 having detent grooves 58 and 59 arranged to receive detent balls 60. These detent balls are carried in side openings of detent pin 61. This detent pin 61 is formed with a reduced threaded portion 62 fitting into the bore in the left end of the piston rod 43. This end of the detent pin is bored out to receive a detent release piston 63 which extends to the left, engaging a detent camming ball 64 which in turn engages the detent balls 60. The camming ball 64 is urged to the right by a spring 65, the left hand end of which is adjustably supported by a shoulder pin 66 fitting into a plug 67 which in turn is threaded into the end of detent pin 61. An adjusting screw 68 is threaded in the plug 67 and abuts the shoulder pin 66. Adjusting of this screw 68 determines the tension on the spring 65 holding the detent balls 60 in place. The end of the cap 51 is covered by a plug 69 held in place by a retainer 70. The plug 69 includes a rubber removable portion 71 which gives access to the set screw 68.

The valve spool 6 is biased to its center or neutral position by means of a centering spring 73 which is supported by spring holders 74 and 75. Both spring holders are loosely mounted on a reduced diameter end portion of the detent pin 61, this providing a shoulder 76 on the detent pin. This shoulder 76 serves as a stop for limiting movement of the spring holder 75 to the right relative to the detent pin 61. The spring holder 74 fits over the plug 67 and is inturned behind this plug, this serving to limit outward movement of the spring holder 74 relative to detent pin 71. When the parts are in the positions shown in FIG. 1, the spring holder 75 bears against an internal shoulder portion 77 formed in the cap 51, which shoulder portion also serves to retain sleeve 57 in place.

The detent release piston 63 of the valve positioning unit has fluid pressure applied to it from the directional control valve means. To this end the piston rod 43 is provided with a bore 78 which communicates with a bore 79 in the spool valve 6. The bore 79 in the spool valve member in turn communicates with a cross bore 80 which extends to the outside of the spool valve member into communication with either the high pressure well 22 or the high pressure well 17 in the valve body.

The cylinder 38 of the pilot controlled actuator 37 is provided with ports 81 and 82 located at opposite ends of the cylinder so as to apply fluid pressure to one side or the other of the piston 42. Port 81 is connected by a fluid pressure line 83 to control port 84 of a three-way self centering pilot valve 85 and the port 82 is connected by line 86 to control port 87 of the pilot valve. This pilot valve is also connected to a fluid pressure line 88 and to an exhaust 89. It will be apparent that when the pilot valve is in the neutral position shown, both lines 83 and 86 are connected to the exhaust and no pressure is applied to the piston 42. If the pilot valve is actuated to the left it will apply fluid pressure to line 83 which applies fluid pressure to the left side of piston 42 causing it to move the spool valve 6 to its right hand position. Conversely if the pilot valve is actuated to its right hand position it will apply fluid pressure to line 86 which applies pressure to the right side of piston 42 causing it to move the spool valve to its left hand position.

Preferably the piston is provided with a peripheral seal 90 (see FIG. 2) engaging the cylinder wall 41, this seal being located in a peripheral slot on the piston. For ease in operation it is preferred that the piston 42 will "float" on the piston rod 43. To this end the hold in the piston is made slightly larger than the diameter of the piston rod 43 on which the piston fits. Also the piston rod is grooved to receive an O-ring 91 which serves as a yieldable seal between the piston and the rod. Preferably Teflon washers 92 are located in the piston rod groove on either side of the ring 91. This arrangement in which the piston floats on the rod avoids binding of the piston in its cylinder without requiring perfect alignment of the piston rod with the cylinder walls. Leakage at the right hand end of the cylinder 38 is preferrably prevented by an outer O-ring 93 at the edge of the adaptor 39 and by an end O-ring 94 between the adaptor and the valve body 2.

OPERATION OF FIGS. 1 AND 2

With the parts in the positions shown in FIG. 1, the spool valve 6 has just been moved to its right hand power position which may have occurred either by manipulation of the pilot valve 85 or by manipulation of the manual operating handle 8. At this time, the piston 42 is in its right hand position adjacent adaptor 39. There is no force on either side of the piston as the pilot valve is in its neutral position in which the space on both sides of the piston is connected to exhaust. The spring holder 74 has been carried with the detent pin to its right hand position and has compressed the spring 73. This spring is urging the spring holder 74 and the spool valve assembly to the left but this force is resisted by the detent balls 60 being held in groove 59 by the force of the detent spring 65. Pressure fluid is flowing from the pump into the high pressure well 17 through passage 19 and past check valve 20 into the high pressure well 23, past the spool valve member into pressure chamber 27 to the valve port 28, and through line 31 to the left side of power piston 34. This urges the power piston 34 to the right and fluid from the other side of this piston passes through line 32 into port 30 to chamber 29 and past the spool valve member 6 into the low pressure passage 26. This action continues until the piston 34 reaches the right end of its stroke. At this time the back pressure from the pump increases and the fluid pressure in chamber 22 is applied through bores 80, 79 and 78 to the end of detent piston 63. This pressure rises suddenly and piston 63 overcomes the tension of spring 65 releasing the detent balls 60. This permits the spring 67 to push spring carrier 74 to the left until it abuts plug 69. This carries the assembly consisting of detent pin 61, piston rod 43 and spool valve 6 to its middle or neutral position where the detent balls 60 are midway between grooves 58 and 59. At this time the spool valve 6 is in its neutral position and both pressure passages 27 and 29 are blocked off, blocking flow from either side of the piston. Also the high pressure well 17 is now in communication with the low pressure passage 18 so that pressure fluid from the pump passes directly back to the pump unloading same.

When it is desired to return the power piston 34 to its left hand position, the pilot valve 85 may be actuated to its right hand position which applies pressure through tube 86 to the right side of the piston 42. The left side of the piston is now connected to exhaust and the fluid pressure drives the piston to its left hand position as shown in FIG. 2. This action is almost instantaneous and the pilot valve may be released to return to its neutral position in which both sides of the piston are connected to exhaust. During this movement the spring holder 75 is pushed to the left by shoulder 76 on the detent pin 57. Spring 67 is once again compressed but is now urging the spool valve assembly to the right back to its neutral position. However the detent balls 60 have now dropped into the groove 58 and are held in this groove by the spring 65. Thus the spool valve is now held in its left hand power position and no pressure is required by either the piston 42 or the manual operator in order to maintain the spool valve in this left hand power position.

As shown in FIG. 2, pressure fluid now flows from the high pressure well 17 into the check valve chamber 19 past check valve 20 into the high pressure well 22 and from there past the spool valve 6 to pressure well 29 and from thence through tube 32 to the right hand side of piston 34. This drives the piston to the left and fluid from the other side of the piston passes through tube 31 to pressure well 27 past the spool valve to the exhaustt passage 25. This action continues until the power piston 34 reaches the left end of its stroke at which time the pressure from the pump builds up and is applied to the detent release piston through passages 80, 79 and 78. This build up in pressure forces the detent release piston 63 to the left against the force of spring 65, this releasing the detent balls 60. The spring 73 now pushes the spring holder 75 to the right. At this time the spring holder 75 is engaging shoulder 76 on the detent pin 61 and pushes this detent pin, the piston rod and the spool valve to the right. This action continues until spring holder 75 engages the internal shoulder 77 in the cap 51. This is the central or neutral position for the spool valve which blocks off both sides of the power piston and connects high pressure well 17 with exhaust passage 18 for unloading the pump.

It will be apparent that the present invention provides a combination pilot and manually actuatable directional control valve. It will also be apparent that the arrangement permits pilot operation of the spool valve in either direction and this does not interfere with manual operation of the valve by the operating handle 8. Only momentary application of pressure to either side of the piston is needed to move the valve to the desired position and hold it there until the power stroke is completed. The removal of pressure from either side of the piston by the self centering pilot valve allows overcontrol by the manual operator at any time in event of an emergency. It also provides for more than one station at which the spool valve may be controlled and the manual operator is always available in event of failure of the pilot valve system.

FIG. 3

Figure 3:
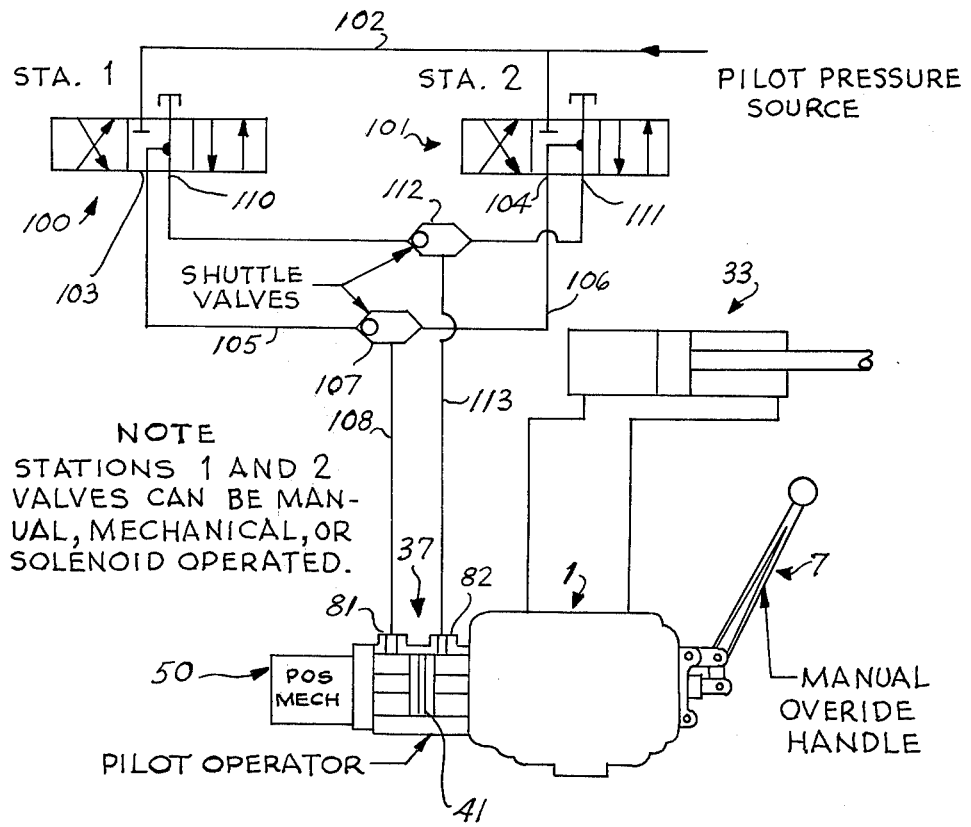
FIG. 3 is a schematic view of the pilot control system including two separate stations for controlling the pilot operator.

FIG. 3 shows schematically a method of providing two independent stations for controlling the directional control valve through the pilot operator. This includes two separate three position type pilot valves 100 and 101 having their inlet ports connected to a common source of pressure 102. Control ports 103 and 104 of each valve are connected by lines 105 and 106 to a shuttle valve 107 the common of which is connected by line 108 to the cylinder port 81. Similarly the other control ports 110 and 111 of the pilot valves are connected to opposite ends of shuttle valve 112 which is in turn connected by line 113 to port 82 of the pilot operator.

It will be apparent that either station 1 or station 2 can cause movement of the power operator piston 41 in either direction and that the shuttle valves serve to block off the unused station when one station is being operated.

While a preferred form of the invention has been shown and described it is apparent that many changes may be made without departing from the spirit and scope of the invention as defined in the following claims.

I claim:

1. In a fluid power system including a combination manually operable and pilot operable spool valve, the combination of, a multi-ported spool valve body having two ends and receiving a double ended spool valve member axially movable in the valve body relative to its two ends, manual operating means at one end of the valve body for engaging the corresponding end of the spool valve member for actuating same, pilot operated means associated with the spool valve member for actuating same independently of the manual operating means, said pilot operated means including a piston and a cylinder therefor arranged to provide a first pressure chamber on one side of the piston, and a second pressure chamber on the other side of the piston whereby the pilot operated means is operable to drive the spool valve member in both directions, means including pilot valve means for controlling pressures in said pressure chambers, said pilot valve means being constructed and arranged to selectively apply pressures to said chambers to cause positive pressure powered movement of the spool valve member in either one direction or the other, said pilot valve means also having a neutral position arranged to neutralize the pilot operated means by neutralizing said pressure chambers to permit free and independent movement of the spool valve member when the pilot valve means is in said neutral position, a valve positioning mechanism also associated with the spool valve member, said mechanism including yieldable detent means arranged to hold the spool valve member in position after movement by the pilot operated means and subsequent neutralization thereof, said mechanism also including automatic means for releasing said detent means and moving the spool valve member in response to a predetermined condition, said yieldable detent means allowing movement of the spool valve member at any time by the manual operating means after the pilot operated means is neutralized, the manual operating means being located at one end of the valve body and engages one end of the spool valve member and the pilot operated means being mounted at the other end of the valve body and actuates the other end of the spool valve member, said pilot operated means and valve positioning mechanism being mounted at the same end of the valve body and include axially movable parts in axial alignment with the valve member, said pilot operated means being mounted between the valve member and valve positioning mechanism, said pilot operated means including a movable piston rod actuated by the piston, said rod serving to connnect the valve member with the valve positioning mechanism.

2. The combination recited in claim 1 in which the automatic means for releasing the detent means is pressure operated and is in communication with the interior of the valve body through a pressure passage extending through the piston rod and valve member.

* * * * *